United States Patent
Han

(10) Patent No.: US 7,048,036 B2
(45) Date of Patent: May 23, 2006

(54) AIR CONDITIONER FOR VEHICLE

(75) Inventor: Seong Seck Han, Daejeon (KR)

(73) Assignee: Halla Climate Control Corporation, Daejeon (KR)

(*) Notice: Subject to any disclaimer, the term of this patent is extended or adjusted under 35 U.S.C. 154(b) by 223 days.

(21) Appl. No.: 10/760,388

(22) Filed: Jan. 21, 2004

(65) Prior Publication Data

US 2004/0244961 A1     Dec. 9, 2004

(30) Foreign Application Priority Data

Jan. 22, 2003    (KR)    ............... 10-2003-0004243

(51) Int. Cl.
*F25B 29/00*     (2006.01)
*B60H 1/00*      (2006.01)
*B60H 3/00*      (2006.01)

(52) U.S. Cl. ................. 165/43; 165/42; 165/202; 454/156; 454/160; 454/161; 237/12.3 A; 237/12.3 B; 62/186; 62/408

(58) Field of Classification Search ............ 165/43, 165/42, 202; 454/156, 160, 161; 237/12.3 A, 237/12.3 B; 62/186, 408
See application file for complete search history.

(56) References Cited

FOREIGN PATENT DOCUMENTS

| JP | 55094810 A | * | 7/1980 |
| JP | 04011514 A | * | 1/1992 |
| JP | 08310222 A | * | 11/1996 |
| JP | 2000219028 A | * | 8/2000 |
| JP | 2001158216 A | * | 6/2001 |
| JP | 2001287535 A | * | 10/2001 |
| JP | 2002079822 A | * | 3/2002 |

* cited by examiner

*Primary Examiner*—John K. Ford
(74) *Attorney, Agent, or Firm*—Lowe Hauptman & Berner, LLP

(57) ABSTRACT

An air conditioner for a vehicle is provided. An internal air passage in a case of the air conditioner includes a first passage which guides a portion of the air from a blower unit to flow through an auxiliary cooling portion of the evaporator, a second passage, which guides the remaining portion of the air from the blower unit to bypass the auxiliary cooling portion of the evaporator, an air mixing portion in which the air passed through the first passage and the air passed through the second passage flow together, and a third passage, which is connected to the air mixing portion and guides the air passed through the air mixing portion to flow through a main cooling portion of the evaporator. In the air conditioner a portion of the air that flows in is cooled twice while passing through the auxiliary cooling portion and the main cooling portion of the evaporator, so that a higher cooling efficiency requirement, especially regarding the early stage cooling performance, is satisfied. In addition, the air conditioner can be made slim.

12 Claims, 6 Drawing Sheets

AIR CONDITIONER FOR VEHICLE

BACKGROUND OF THE INVENTION

This application claims the priority of Korean Patent Application No. 2003-4243, filed on Jan. 22, 2003, in the Korean Intellectual Property Office, the disclosure of which is incorporated herein in its entirety by reference.

1. Field of the Invention

The present invention relates to an air conditioner for a vehicle, and more particularly, to an air conditional for a vehicle, which has an improved air passage structure for higher early stage cooling efficiency, allows easy drainage of condensed water from an evaporator, and can be made slim according to various requirements of vehicle makers.

2. Description of the Related Art

In general, air conditioners for vehicles, which control the interior temperature and humidity to provide delightful driving conditions, include a cooler and a heater. The cooler generates cool air by evaporating a coolant coming into an evaporator using a latent heat of vaporization taken from air flowing around the evaporator and supplies the generated cool air into the interior compartment of the vehicle. The heater circulates cooling water heated by the heat taken from the engine along a heater core to heat air surrounding the heat core and supplies the heated hot air into the interior compartment of the vehicle.

To this end, a general air conditioner for a vehicle includes a case with an internal air passage along which external air that is blown through a blower unit flows, and cooling and heating heat exchangers disposed at both ends of the air passage to produce cool air or hot air.

Such air conditioners for vehicles are classified into semi-center mount type air conditioners and center mount type air conditioners depending on the location of the blower unit. Semi-center mount type air conditioners have a blower unit in a side portion of the case with an air passage connected to the blower unit to supply air through the air passage in the case. Center mount type air conditioners have a blower unit in the middle of the case with an air passage to directly supply air blown through the blower unit to the air passage.

FIG. 1 is a sectional view of a conventional air conditioner for a vehicle. Referring to FIG. 1, a conventional air conditioner includes a case 1 with an internal air passage 3 through which air that is blown through a blower unit 2 flows, an evaporator 4, which is a cooling heat exchanger arranged in the internal passage 3 of the case, and a heater core 6, which is a heating heat exchanger arranged next to the evaporator 4 in the internal passage 3. A tamp door 5 controls opening and closing of a connection passage between the evaporator 4 and the heater core 6 to guide air from the evaporator 4 toward the heater core 6. Air blow direction switching doors 9 are opened or closed depending on the mode chosen by a passenger to allow cool air or hot air to be discharged through openings 7 and 8.

However, the following problems arise with the conventional air conditioner for a vehicle structured as described above.

First, the evaporator 4 is arranged almost perpendicular to a bottom wall 1*a* of the case 1 so that a portion of the evaporator 4 is too far from the interior wall of the case 1, thereby requiring a longer inlet/outlet pipe 48, which is connected to the evaporator 4.

Second, water condensed by the evaporator 4 drops and is scattered by air flowing near the evaporator 4, so that it is difficult to expel the condensed water. The scattering water vaporizes near the heater core 6 and degrades the performance of the heater core 6.

Third, due to the arrangement of the evaporator 4 almost perpendicular to the bottom wall of the case 1, a larger space is required for the evaporator 4 in the case 1, thereby making it difficult to manufacture slimmer air conditioners.

Fourth, since air to be cooled is allowed to pass the evaporator 4 only one time, it is difficult to expect satisfactorily high cooling efficiency at an early stage of operating the vehicle or in the summer season.

Fifth, the structure of the evaporator is unsuitable for slimmer, higher efficiency air conditioners.

In an air conditioner for a vehicle, which is disclosed in JP Laid-open Patent Publication No. 2001-158216, hot air is preliminarily dehumidified in an auxiliary cooling zone of a cooling heat exchanger before entering a main cooling zone, thereby suppressing condensation of air into water in the main cooling zone. In addition, the auxiliary cooling zone is located under the main cooling zone at an angle, so that condensed water generated in the main cooling zone is allowed to drop into the auxiliary cooling zone to be discharged more efficiently together with condensed water which is generated during dehumidification in the auxiliary cooling zone. Furthermore, the cooling heat exchanger ranges over a wide area, through both ascending and descending passages, so that a smaller, more efficient air conditioner can be implemented with this cooling heat exchanger.

However, in the air conditioner, the air that is blown through the blower unit flows through the auxiliary cooling zone and then the main cooling zone of the evaporator. As a result, the air volume is reduced while passing the auxiliary cooling zone, and more noise is generated.

SUMMARY OF THE INVENTION

The present invention provides an air conditioner for a vehicle, which has an improved air passage structure for higher cooling efficiency, especially at an early cooling stage.

The present invention also provides an air conditioner for a vehicle, which allows easy draining of condensed water generated by an evaporator.

The present invention also provides an air conditioner for a vehicle, which can be manufactured to be slim according to various requirements of vehicle makers.

In one aspect of the present invention, there is provided an air conditioner for a vehicle, comprising: a case including an air passage along which air that is blown through a blower unit flows; and an evaporator and a heater core, which are arranged sequentially in the air passage. The air passage includes a first passage which guides a portion of the air from the blower unit to flow through a first cooling portion of the evaporator, a second passage, which guides the remaining portion of the air from the blower unit to bypass the first cooling portion of the evaporator, an air mixing portion in which the air passed through the first passage and the air passed through the second passage flow together, and a third passage, which is connected to the air mixing portion and guides the air passed through the air mixing portion to flow through a second cooling portion of the evaporator.

The heater core may be arranged over the first cooling portion and the second cooling portion of the evaporator. An inlet/outlet pipe 48 connected to the evaporator may be arranged in the second passage.

The evaporator may be inclined at a small angle with a front end in a higher position than a rear end so that air flows from the front end toward the rear end.

A guide plate may be installed between the first passage and the third passage to guide the air passed through the first passage toward the third passage.

A drainage way may be formed between a rear end of the evaporator and an interior wall of the case to expel condensed water generated by the evaporator. A drain hole may be formed in a bottom wall of the case to correspond to the rear end of the evaporator to expel condensed water generated by the evaporator. A barrier wall may be formed between the third passage and the drainage way below the rear end of the evaporator. In this case, the barrier wall is formed to correspond to a center portion of the drain hole.

20–30% of the air that is blown through the blower unit may pass the first cooling portion of the evaporator through the first passage.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
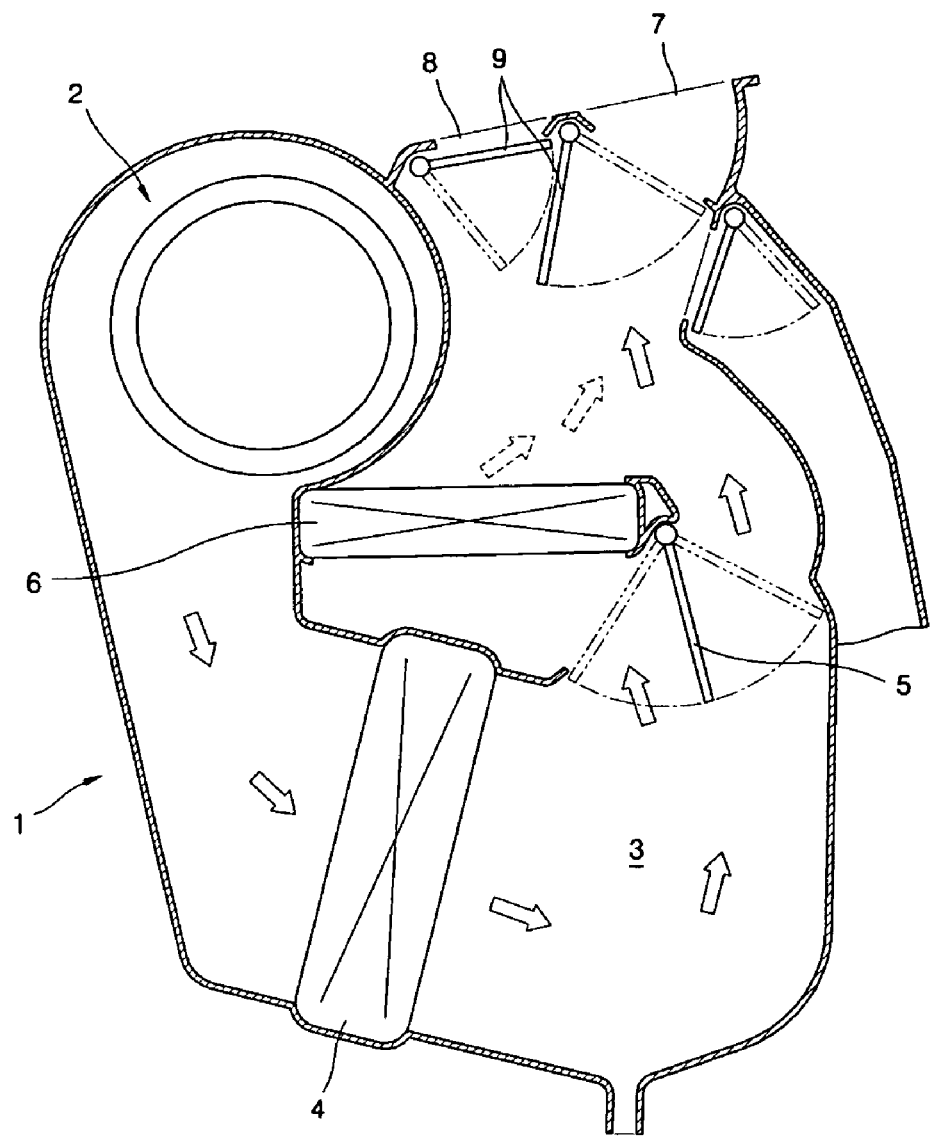
FIG. 1 is a sectional view of a conventional air conditioner for vehicles.
Figure 2:
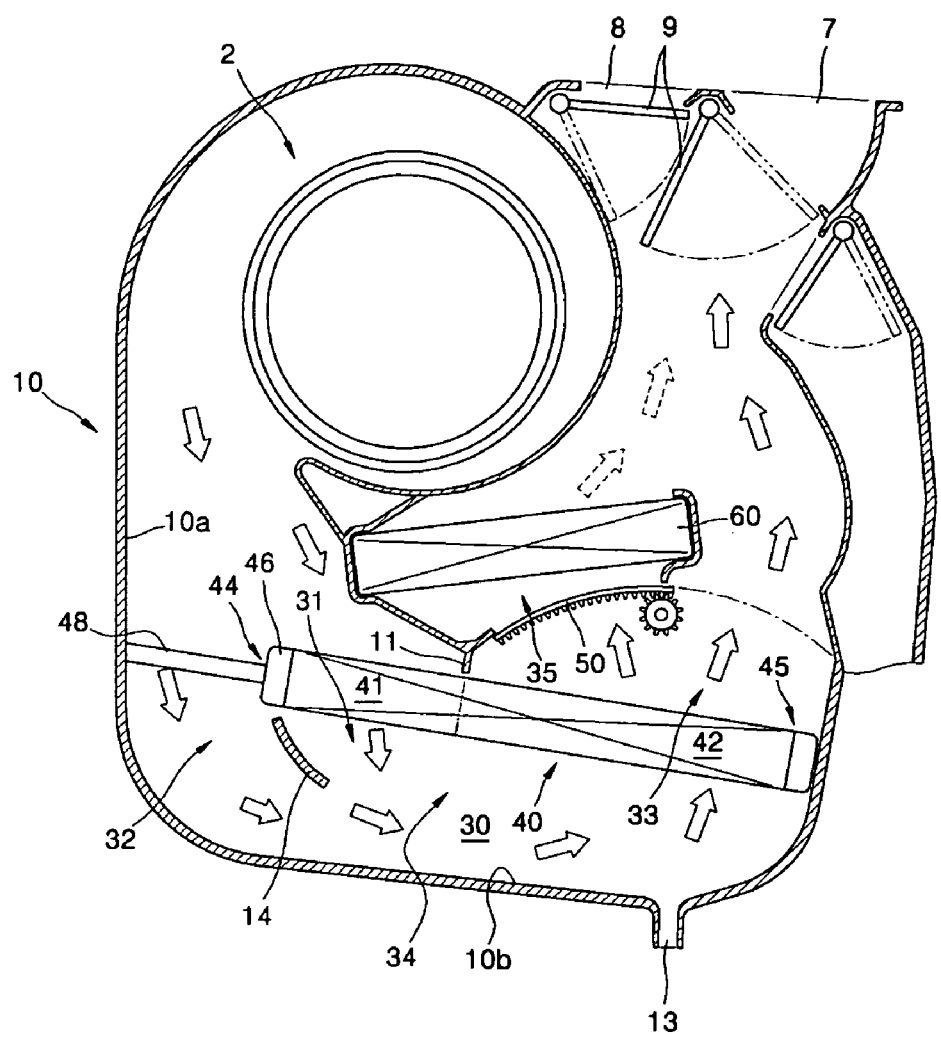
FIG. 2 is a sectional view of an air conditioner for a vehicle according to an embodiment of the present invention.

An air conditioner for a vehicle according to an embodiment of the present invention is illustrated in FIG. 2. Reference numerals that are the same as in FIG. 1 denote the same elements as in FIG. 1.

Referring to FIG. 2, an air conditioner for a vehicle according to an embodiment of the present invention includes a case 10 with an internal air passage 30, which guides air that is blown through a blower unit 2 to flow, and an evaporator 40 and a heater core 60, which are arranged sequentially in the air passage 30 of the case 10.

The evaporator 40 is inclined at a small angle with a front end 44 in a higher position than a rear end 45 so that air flows from the front end 44 toward the rear end 45. The rear end 45 of the evaporator 40 is in contact with an interior wall 10a of the case 10. A drain hole 13 through which water condensed by the evaporator 40 is externally discharged is formed in a region of a bottom wall of the case 10 under the rear end 45 of the evaporator 40. The evaporator 40 is partitioned into a first cooling portion 41 and a second cooling portion 42.

The air passage 30 in the case 10 includes a first passage 31 which guides a portion of air from the blower unit 2 to flow through the first cooling portion 41 of the evaporator 40, a second passage 32, which guides the other portion of the air from the blower unit 2 to bypass the first cooling portion 41, an air mixing portion 34 in which the air passed through the first passage 31 and the air passed through the second passage 32 flow together, and a third passage 33, which is connected to the air mixing portion 34 and guides the air passed through the air mixing portion 34 to flow through the second cooling portion 42 of the evaporator 40. The blower unit 2 opens to the first passage 31 and the second passage 32 above the evaporator 40. The first passage 31 and the second passage 32 open to the third passage 33 below the evaporator 40. The first passage 31 and the second passage 32 may be separated from one another by a tank portion of the evaporator 40. The first passage 31 and the third passage 33 may be separated from one another by a barrier wall 11, which extends from an internal wall 10a of the case 10. 20–40% of the air which flows in the air passage 30 from the blower unit 40 may be allowed to pass the first cooling portion 41 of the evaporator 40 through the first passage 31.

The heater core 60 may be arranged almost parallel to the evaporator 40. The heater core 60 is aligned with a center portion of the evaporator 40. The heater core 60 may be located between the first passage 31 and the third passage 33. A inlet/outlet pipe 48 connected to the evaporator 40 may be located adjacent to an air discharge portion of the blower unit 2. The inlet/outlet pipe 48 may go through the evaporator 40. As a result, air flowing in the evaporator 40 can be superheated efficiently by the hot air that is blown through the blower unit 2. A connection passage 35, which connects the third passage 33 and the heater core 60, may be opened or closed by a sliding door 50.

In the air conditioner having the above structure according to the present invention, a portion of the air that is blown through the blower unit 2 into the air passage 30 of the case 10 is cooled while passing the first cooling portion 41 of the evaporator 40 through the first passage 31 and cooled once more while passing the second cooling portion 42 of the evaporator 40 through the third passage 33. In other words, a portion of the air which flows in the air conditioner is cooled over two times, so that the cooling performance of the evaporator 40 is improved. Therefore, sufficiently cool air can be supplied to the internal compartment of the vehicle efficiently in a short time after starting the vehicle or even in the summer season when the temperature of air is high. Recently, more consumers tend to regard the initial stage cooling efficiency as a more important quality factor of air conditioners. The evaporator 40 raises cooling efficiency and can be manufactured to be slim.

In addition, since only a portion of the air that is blown through the blower unit 2 is allowed to flow through the first passage 31 and primarily cooled in the first cooling portion 41 of the evaporator 40, the air can pass through the first passage 31 more smoothly and a larger volume of cooling air can be generated without generating noise.

Since the front end 44 of the evaporator 40 is separated from the interior wall 10a of the case 10, the evaporator 40 can be arranged more freely in the air conditioner, thereby making it easier to design various air conditioners.

Furthermore, since the evaporator 40 is inclined at an angle so that the front end 44 is positioned at a higher level than the rear end 45, and the drain hole 13 is formed under the rear end 45 of the evaporator, condensed water generated by the evaporator 40 is allowed to flow off more efficiently through the drain hole 13.

The arrangement of the heater core 60 almost parallel to the evaporator 40 makes it possible to manufacture a slimmer air conditioner. The sliding door 50 installed to open and close the connection passage 35 between the third path 33 and the heater core 60 more contributes to designing a slim air conditioner.

A guide plate 14 may be installed below the first cooling portion 41 of the evaporator 40 to guide the air passed through the first cooling portion 41 toward the third passage 33.

Figure 3:
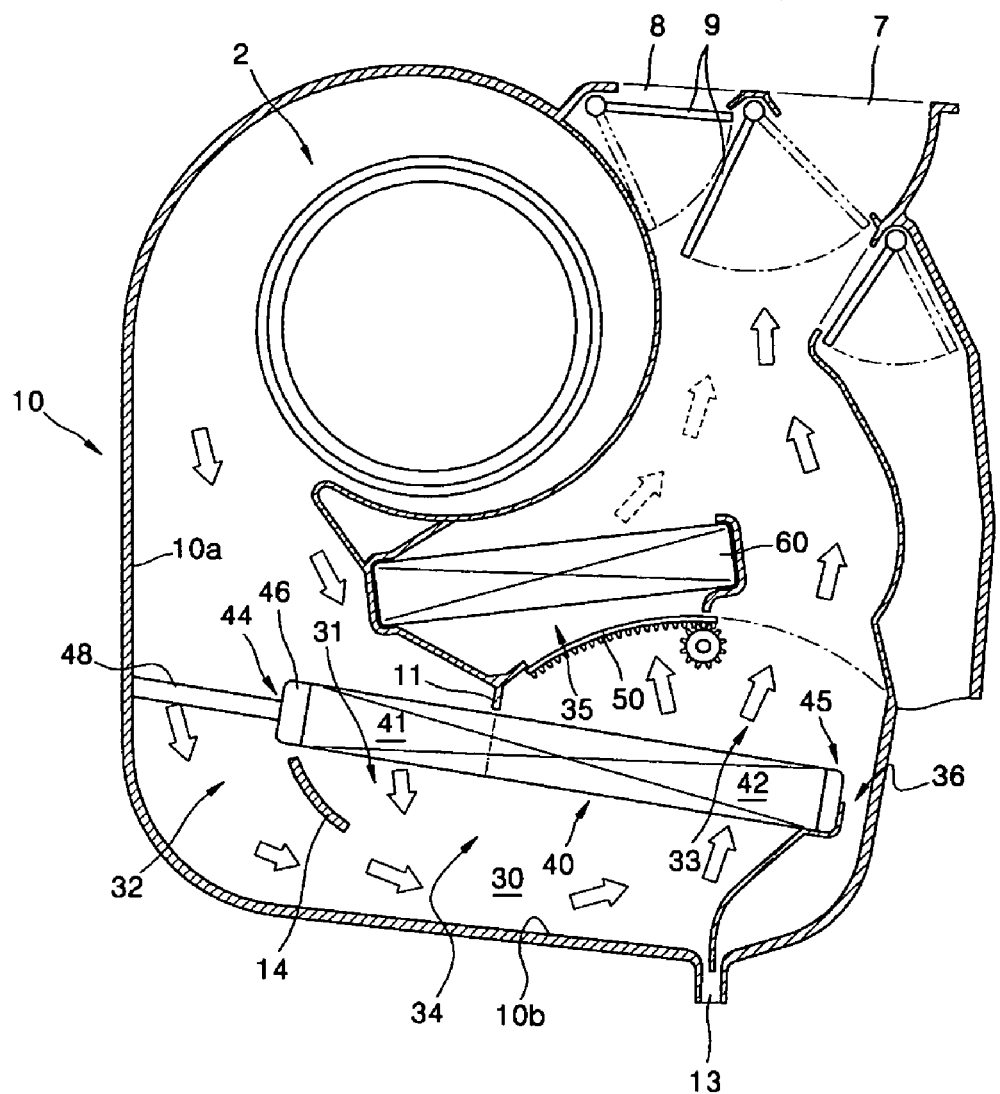
FIG. 3 is a sectional view of an air conditioner for a vehicle according to another embodiment of the present invention.

FIG. 3 is a sectional view of an air conditioner for a vehicle according to another embodiment of the present invention. Reference numerals that are the same as in FIG. 2 denote the same elements as in FIG. 2, and thus descriptions on those elements will not be repeated here.

As illustrated in FIG. 3, a drainage way 36 is formed between the rear end 45 of the evaporator 40 and the interior wall 10a of the case 10 such that the condensed water generated in the evaporator 40 flows down and drains through the drainage way 35 and the drain hole 13. The drainage way 36 guides the condensed water generated by the evaporator 40 to flow toward the drain hole 13.

Figure 4:
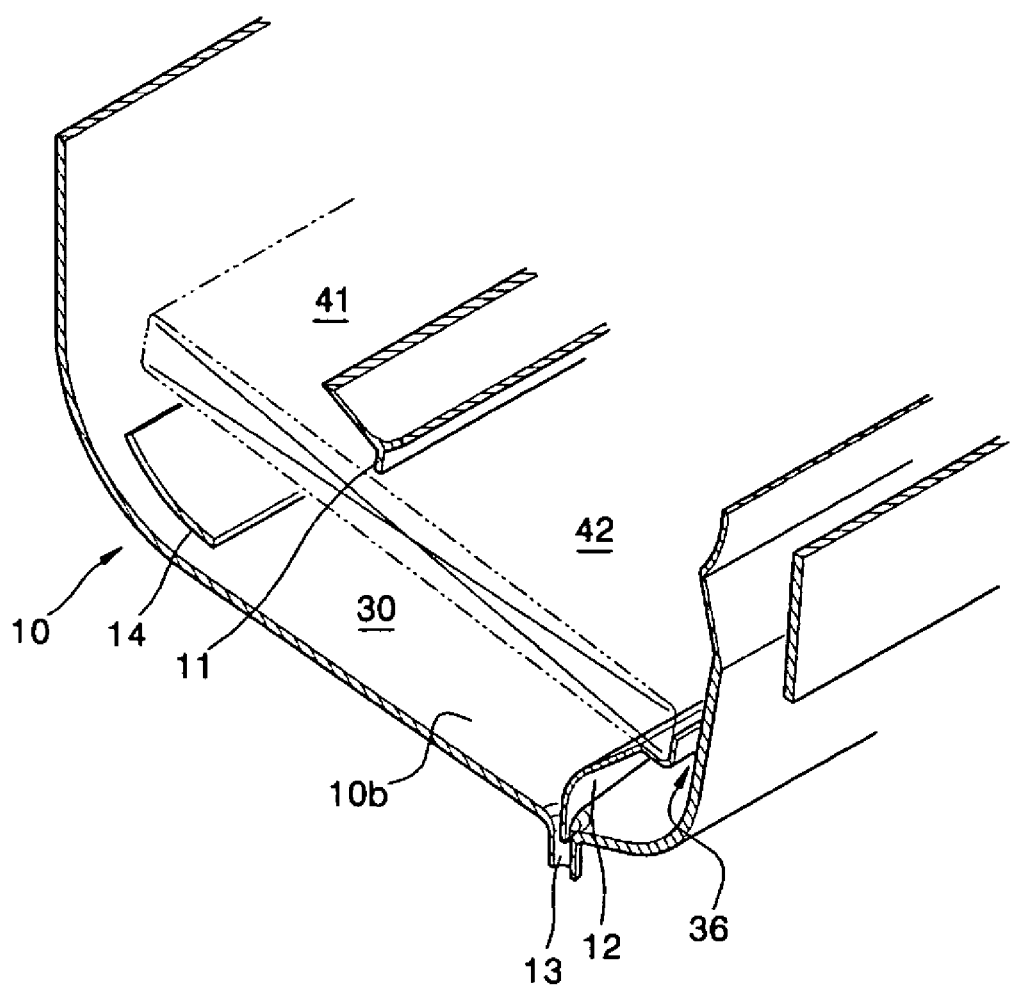
FIG. 4 is a partial perspective view illustrating the location of a barrier wall in FIG. 3.

A barrier wall 12 is installed between the drainage way 36 and the third passage 33 below the rear end 45 of the evaporator 40. The barrier wall 12 may be installed to correspond to a center portion of the drain hole 13, as illustrated in FIG. 4, so that condensed water in the air passage 30 and condensed water in the drainage way 36 can flow off more smoothly through the drain hole 13.

In the air conditioner according to the present invention illustrated in FIG. 3, due to the drainage way 36 formed between the rear end 45 of the evaporator 40 and the interior wall 10a of the case 10, condensed water generated by the evaporator 40 can flow to the drain hole 13 where it is expelled from the air conditioner. In addition, the barrier wall 12 guides the air that flows in the third passage 33 to flow through the second cooling portion 42 of the evaporator 40 not to go through the drainage way 36.

Although the center-mount type air conditioners, in which the blower unit 2 is arranged in the middle of the case 10, are illustrated in FIGS. 2 and 3, it will be appreciated that the invention is not limited to the particular forms described above and that the above-described features of the air conditioners may be applied to a semi-center mount type air conditioner with the blower unit 2 in a side portion of the case 10.

Figure 5:
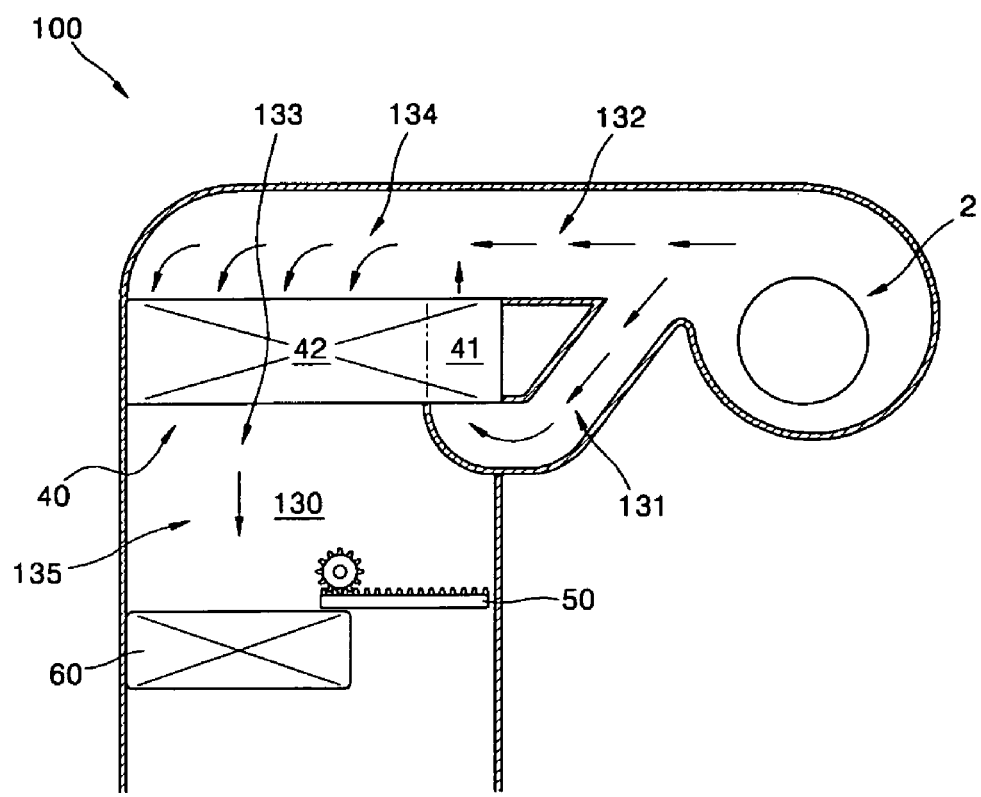
FIG. 5 is a sectional view of an air conditioner for a vehicle according to another embodiment of the present invention.

FIG. 5 is a sectional view of an air conditioner for a vehicle according to another embodiment of the present invention. Reference numerals that are the same as in FIGS. 1 through 4 denote the same elements as in FIGS. 1 through 4, and thus descriptions on those elements will not be repeated here.

As illustrated in FIG. 5, air that is blown through the blower unit 2 flows in the air passage 130 in the case 100 through first through fourth air passages 131, 132, 133, and 134. The evaporator 40 and the heater core 60 are arranged sequentially in the air passage 130. The first air passage 131 branches off from the second air passage 132 to guide a portion of the air that is blown by the blower unit 1 into the first cooling portion 41 of the evaporator 40. The third air passage 133 is an air mixing portion in which the air passed through the second air passage 132 joins the air flowing through the first air passage 131. The fourth air passage 134 guides the air flowing along the third air passage 133 to pass the second cooling portion 42 of the evaporator 40.

The first air passage 131 branching off from the second air passage 132 is interconnected with the second air passage 132 by the first cooling portion 41 of the evaporator 40 so that external air that comes in the second air passage 132 diverges from the second air passage 132 toward the first air passage 131, passes through the first cooling portion 41 of the evaporator 40, and joins the external air flowing through the second air passage 132 in the third air passage 131.

20–40% of the air that is blown from the blower unit 2 may be allowed to pass the first cooling portion 41 of the evaporator 40 through the first air passage 131.

A connection passage 135 with a sliding door 50 is formed between the fourth air passage 134 and the heater core 60.

In the air conditioner according to the present invention illustrated in FIG. 3, a portion of the air that is blown from the blower unit 2 is cooled while passing the first cooling portion 41 of the evaporator 40 through the first air passage 131 and cooled once more together with the air flowing through second air passage 132 while passing the second cooling portion 42 of the evaporator 40 through the third air passage 133. Since a portion of the air blown from the blower unit 2 is cooled two times, the cooling performance, especially the early stage cooling performance, of the evaporator 40 is improved.

Figure 6:
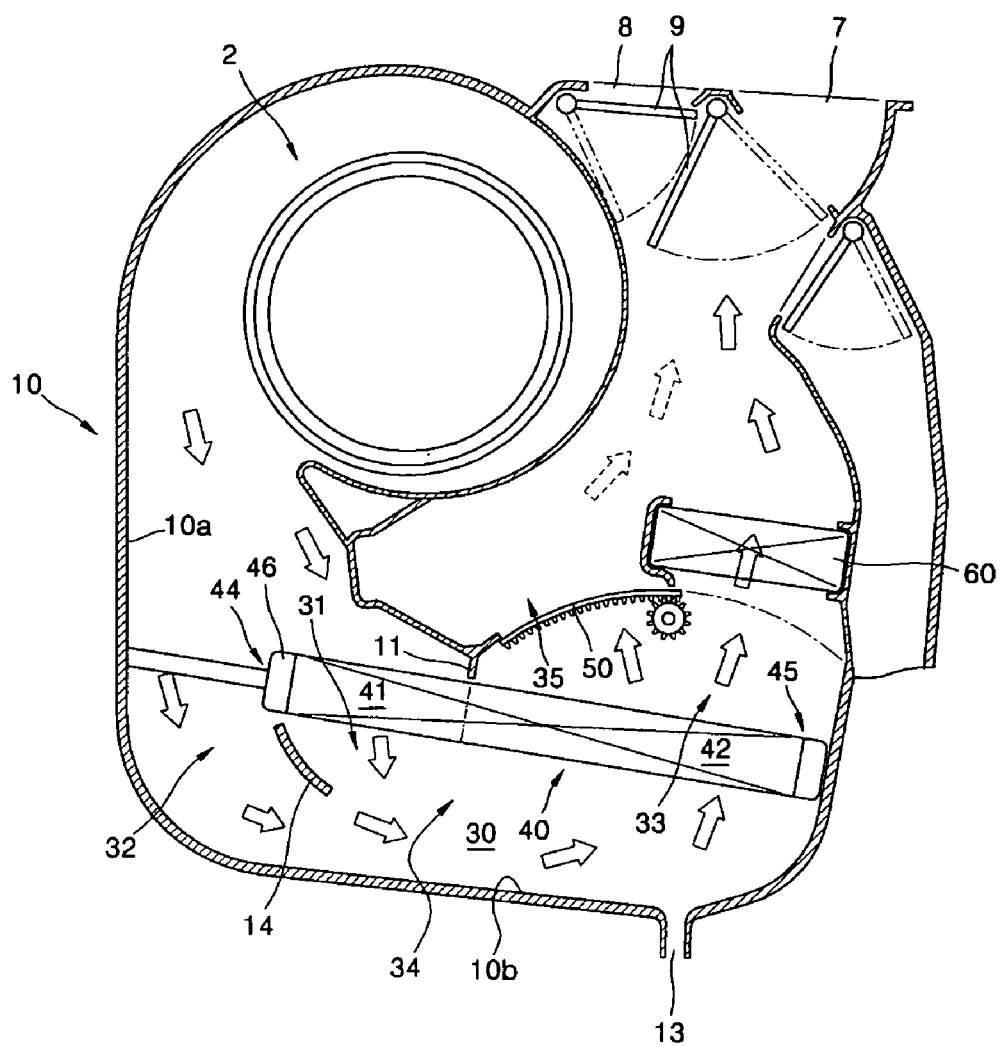
FIG. 6 is a sectional view of an air conditioner for a vehicle according to another embodiment of the present invention.

FIG. 6 is a sectional view of an air conditioner for a vehicle according to another embodiment of the present invention. Reference numerals that are the same as in FIGS. 1 through 5 denote the same elements as in FIGS. 1 through 5, and thus descriptions on those elements will not be repeated here.

Comparing with the air conditioner illustrated in FIG. 3, the heater core 60 of the air conditioner in FIG. 6 is arranged to correspond to the second cooling portion 42 of the evaporator 40. The heater core 60 may be arranged in an air-flow path along which air flows toward the openings 7 and 8 adjacent to the interior compartment of the vehicle. As a result, the air passed through the air mixing portion 34 and the second cooling portion 42 of the evaporator 40 is allowed to flow through the entire heater core 60, thereby improving heating efficiency. Furthermore, hot air from the heater core 60 is guided more smoothly toward the openings 7 and 8.

As described above, an air conditioner for a vehicle according to the present invention provides the following effects.

First, a portion of the air that flows in the air passage of the case is cooled twice while passing the first cooling portion and the second cooling portion of the evaporator, thereby improving the cooling performance of the air conditioner. Only a portion of the air from the blower unit is allowed to pass through the first cooling portion of the evaporator, so that the resistance to air-flow decreases, increasing the volume of air that passes through the evaporator and leading to noise reduction. The air conditioner for a vehicle according to the present invention can be manufactured in a compact size satisfying a higher cooling efficiency requirement, by varying the position, size, and thickness of the evaporator. The air conditioner according to the present invention satisfies a higher early stage cooling efficiency requirement required by consumers.

Second, since the evaporator is inclined at a small angle with the front end of the evaporator in a higher position than the rear end, and the drain hole is formed in a portion of the bottom wall of the case aligned with the rear end of the evaporator, condensed water generated by the evaporator can be removed more effectively.

Third, by arranging the heater core to be almost parallel to the evaporator and closer to the blower unit as well as the evaporator, a more compact air conditioner with a smaller dead space can be manufactured.

Fourth, only a portion of the air that is blown from the blower unit is allowed to pass through the first cooling portion of the evaporator and then through the second cooling portion, while the remaining portion of the air bypasses the first cooling portion. As a result, the air can be cooled efficiently without a reduction in air volume and generating noise.

Fifth, a inlet/outlet pipe is located in an air passage (second passage 32 in FIGS. 2 and 3) close to the blower unit, so that a coolant flowing through the inlet/outlet pipe 48 is superheated by external air that is blown through the blower unit and consumes rapidly, thereby improving cooling efficiency.

Sixth, the coolant flowing through the inlet/outlet pipe located close to the blower unit vaporizes more easily while superheated by the external air from the blower unit, so that the coolant in vapor form, not liquid form, returns to a compressor, thereby preventing damage from a liquid coolant.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An air conditioner for a vehicle, comprising:
a case including an air passage along which air that is blown through a blower unit flows; and
an evaporator and a heater core, which are arranged in the air passage,
wherein the air passage includes a first passage which guides a portion of the air from the blower unit to flow through a first cooling portion of the evaporator, a second passage, which guides the remaining portion of the air from the blower unit to bypass the first cooling portion of the evaporator, an air mixing portion in which the air passed through the first passage and the air passed through the second passage flow together, and a third passage, which is connected to the air mixing portion and guides the air passed through the air mixing portion to flow through a second cooling portion of the evaporator.

2. The air conditioner of claim 1, wherein the heater core is arranged over the first cooling portion and the second cooling portion of the evaporator.

3. The air conditioner of claim 1, wherein an inlet/outlet pipe of the evaporator is arranged in the second passage.

4. The air conditioner of claim 1, wherein the evaporator is inclined at a small angle with a front end in a higher position than a rear end so that air flows from the front end toward the rear end.

5. The air conditioner of claim 1, wherein the first passage and the second passage are separated from one another by a tank portion of the evaporator.

6. The air conditioner of claim 1, wherein a guide plate is installed between the first passage and the third passage to guide the air passed through the first passage toward the third passage.

7. The air conditioner of claim 4, wherein a drain hole is formed in a bottom wall of the case to correspond to the rear end of the evaporator to expel condensed water generated by the evaporator.

8. The air conditioner of claim 1, wherein a drainage way is formed between a rear end of the evaporator and an interior wall of the case to expel condensed water generated by the evaporator.

9. The air conditioner of claim 8, wherein a drain hole is formed in a bottom wall of the case to correspond to the rear end of the evaporator to expel condensed water generated by the evaporator.

10. The air conditioner of claim 9, wherein a barrier wall is formed between the third passage and the drainage way below the rear end of the evaporator.

11. The air conditioner of claim 10, wherein the barrier wall is formed to correspond to a center portion of the drain hole.

12. The air conditioner of claim 1, wherein 20–30% of the air that is blown through the blower unit passes the first cooling portion of the evaporator through the first passage.

* * * * *